United States Patent [19]

Ichiyanagi

[11] 4,421,397
[45] Dec. 20, 1983

[54] AUTOMATIC FOCUSING SYSTEM WITH INTERCHANGEABLE LENS

[75] Inventor: Toshikazu Ichiyanagi, Mitaka, Japan

[73] Assignee: Canon Kabushiki Kaisha, Tokyo, Japan

[21] Appl. No.: 362,310

[22] Filed: Mar. 26, 1982

[30] Foreign Application Priority Data

Apr. 3, 1981 [JP] Japan .............................. 56-48658[U]

[51] Int. Cl.³ ............................ G03B 3/00; G03B 1/18
[52] U.S. Cl. .................................. 354/400; 354/173.1
[58] Field of Search ................ 354/25 R, 25 A, 25 P, 354/25 N, 195, 197, 173, 286, 288, 295, 60 R; 352/140, 142, 243

[56] References Cited

U.S. PATENT DOCUMENTS

| 3,539,253 | 11/1970 | Roppel | 352/243 |
| 3,762,295 | 10/1973 | Kitai | 354/286 |
| 3,836,919 | 9/1974 | Matsumoto et al. | 354/25 A |
| 3,940,777 | 2/1976 | Komine | 352/140 X |
| 4,323,303 | 4/1982 | Enomoto | 354/197 X |

Primary Examiner—William B. Perkey
Attorney, Agent, or Firm—Toren, McGeady & Stanger

[57] ABSTRACT

In the disclosed system, an accessory unit arranged to hold a power source operates with a camera and a current supply circuit supplies current to electrical parts in a controllable interchangeable lens through electrical connection means in the lens in response to closure of the camera's release switch when the accessory unit and the lens are attached to the camera.

4 Claims, 4 Drawing Figures

AUTOMATIC FOCUSING SYSTEM WITH INTERCHANGEABLE LENS

BACKGROUND OF THE INVENTION

1. Field of the Invention

This invention relates to systems using interchangeable lenses, and more particularly to current supply systems for automatic focusing interchangeable lenses.

2. Description of the Prior Art

Recently, in the art of range-finder type cameras, mid-priced cameras and like photographic instruments which have objective lenses built into the camera housings, many techniques have recently been developed for automatically adjusting the position of the objective lens in accordance with the signal representing the object distance measured by an auto-focus unit incorporated in the camera. Many articles employing the same are available in the market. Also in the art of photographic systems of single lens reflex cameras and interchangeable lenses, proposals have been made for the automatic focus adjustment of the objective lens. An interchangeable lens carrying a range finding unit, a focusing lens drive motor and a control mechanism within its structure is also known.

The focusing lens of the interchangeable lens mount is connected to be driven by a the motor, the signal from a range finding device and the signal representing the position of the focusing lens are detected, and the motor is driven depending upon the signals to control movement of the focusing lens. Thus, an auto-focus photographic system using such interchangeable lens mount and the camera body, with the interchangeable lens carrying out its own focusing operation without interface with the camera body, necessitates no channels to the various devices and permits the interchangeable lens and the camera body to be designed as products independent of each other. In this case, when the automatic focusing device comprising the range finding means, motor and computer circuit are incorporated in the interchangeable lens mount, it is necessary that an electrical power source therefor, for example, a battery, be also incorporated in the interchangeable lens mounting. However it is not desirable to incorporate a battery of too large capacity in the interchangeable lens.

Also when incorporating the battery or like electrical power source in the interchangeable lens, a problem arises in the design of the structure of the lens barrel, for example, the shape, bulk and size, may adversely affect holding of the camera when shooting.

But with a battery of small capacity, the camera becomes impossible to use, or fast consumption of electrical energy results. These too are undesirable.

A purpose of the present invention is to supply a means for solving the above-described problems. Where the camera has the interchangeable lens along with an automatic winding unit, in general, the automatic winding unit is equipped with an electrical power source portion of large capacity. Therefore, a solution of the above-described problems is achieved by using this electrical power source portion in supplying current to the automatic focusing device in the interchangeable lens.

Summary of the Invention

An object of the present invention is to provide a current supply system for an interchangeable lens, and particularly to provide a system for receiving current supplied from an electrical power source unit which stores a large capacity of energy.

Another object of the present invention is to provide a system operating in such a manner that, as the interchangeable lens is equipped with a focusing device, said focusing device is supplied with current in response to actuation of a camera release, and the current supply is cut off when the camera is not released.

A further object of the present invention is to provide a novel method of and apparatus for electrical connection between an accessory unit having an electrical power source portion and an interchangeable lens equipped with an automatic focusing device.

A furthermore object of the invention is to provide a device for performing current supply to an interchangeable lens by an output from a charging circuit as said charging circuit is provided in a current supply circuit between the electrical power source unit and the interchangeable lens.

DESCRIPTION OF THE PREFERRED EMBODIMENT

Figure 1:
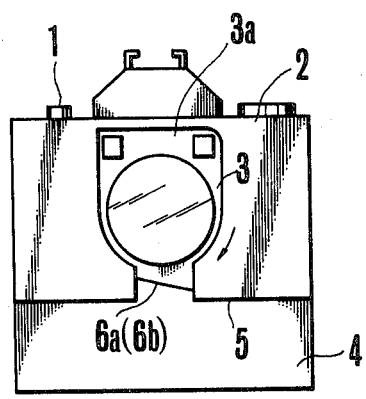
FIG. 1 is a front elevational view of a photographic system having a camera 2, an interchangeable lens 3 and an automatic winding device 4 in combination.

The present invention is described in connection with an embodiment thereof by reference to FIGS. 1 to 3.

Figure 2:
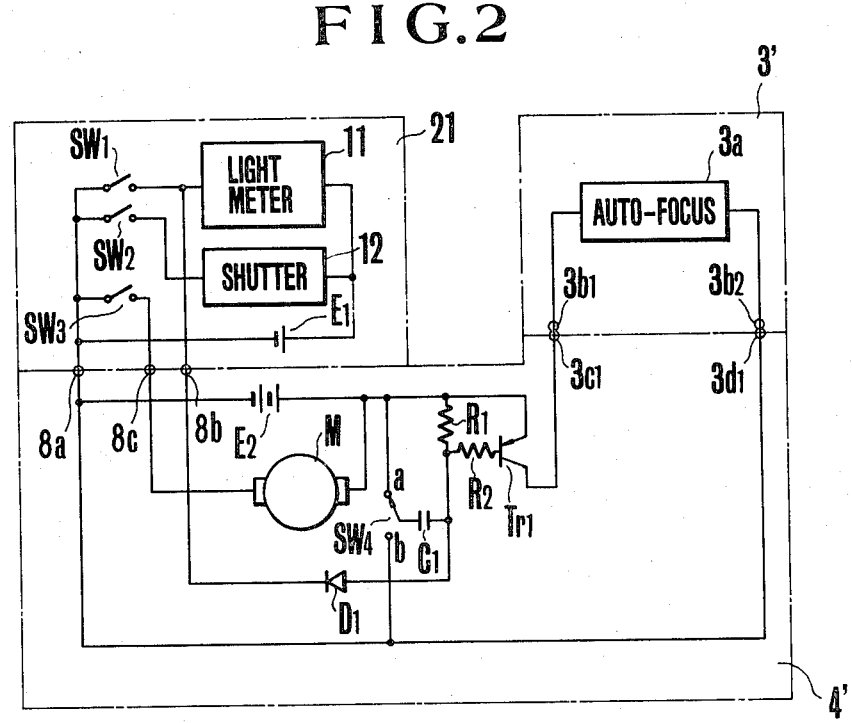
FIG. 2 is an electrical circuit diagram, partly in block form, of the photographic system of FIG. 1.
Figure 3:
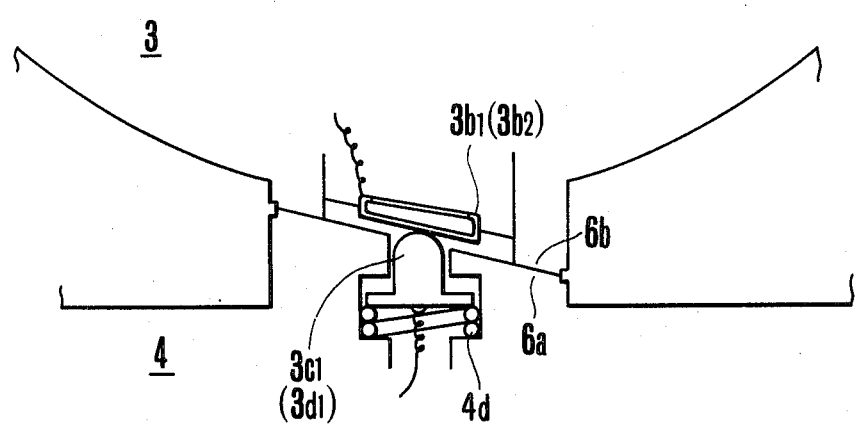
FIG. 3 is a sectional view of a connector portion between the interchangeable lens and the automatic winding device.
Figure 3:
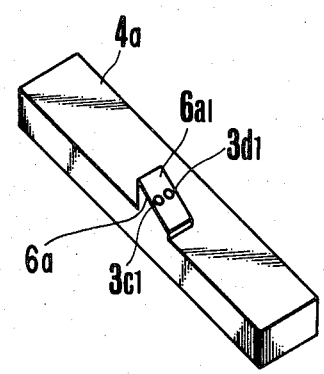

In the drawings a release button 1 is arranged, upon first stage or step of its stroke, to close a switch SW1 of FIG. 2 so that a metering circuit 11 is supplied with current. Upon the second stage of the stroke of the release button 1, a switch SW2 of FIG. 2 is closed, by which a shutter control circuit 12 of known construction is supplied with current. A camera body 2 has an interchangeable lens 3 releasably attached thereto. Incorporated in the interchangeable lens 3 is an automatic focusing device 3a as described above. An accessory unit 4, for example, an automatic winding unit of known construction, is provided with an electrical power source E2 of large capacity.

Figure 4:
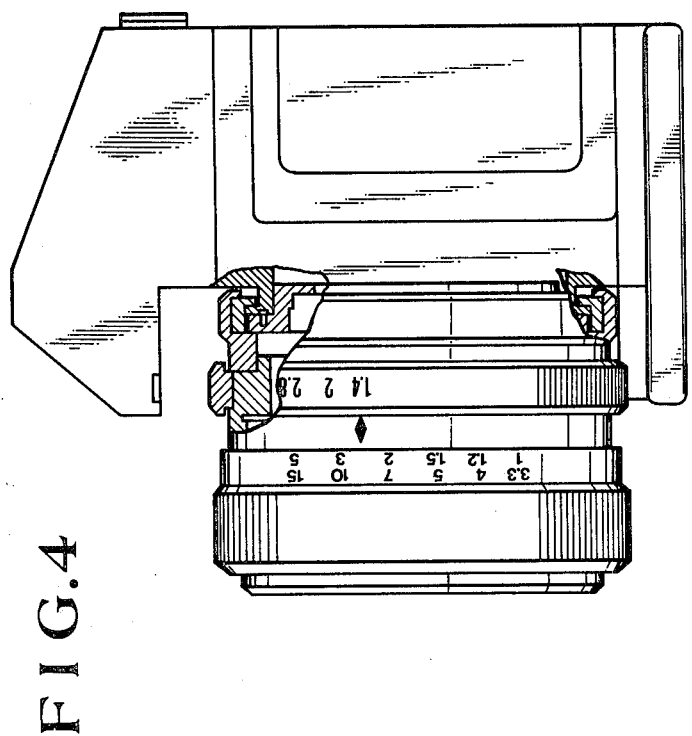
FIG. 4 is a partial side elevation, partly in section of the system in FIG. 1.

FIG. 2 illustrates electrical circuit blocks 2′,3′, and 4′ respectively in the camera, interchangeable lens 3 and automatic winding unit 4. A motor M in the block 4′ of the automatic winding unit 4 serves for film winding and/or film rewinding. connector portions 3b1 and 3b2 serve for electrical connection between the automatic focusing device 3a in the interchangeable lens 3 and the electrical power source E2 of the automatic winding unit 4. The arrangement is such that as the interchangeable lens 3 is turned in the direction indicated by arrow of FIG. 1, brushes 3c1 and 3d1 slidingly move on the electrodes 3b1 and 3b2, and when the interchangeable lens reaches the terminal end of tightening movement, connections at connector portions 6a and 6b are completed. That is, the automatic winding unit 4 illustrated in the present embodiment when attached to the bottom of the camera housing is assumed to project out of the front panel of the camera housing in a portion thereof, as, for example, illustrated in FIG. 4.

The electrical power source portion 4a of the automatic winding unit 4 is fixedly provided with a connector 6a having terminals 3c1 and 3d1 for connection with the connectors 3b1 and 3b2 of the interchangeable lens 3, and a portion of the connector 6a has an inclined surface 6a1. The terminals 3c1 and 3d1 are urged by a spring 4d beyond the surface 6a1.

An interchangeable lens connector 6b is arranged on the outer periphery of the lens barrel so that, as the interchangeable lens is turned about the optical axis so as to effect coupling with the camera body, when the coupling completion position of the interchangeable lens is reached, the above-described connector 6b and the opposite connector 6a are mated with each other, thus completing connection of the brushes 3c1 and 3d1 with the electrodes 3b1 and 3b2. With the block 4', parts R1, R2, Tr1 and D1 constitute a current supply circuit; and a switch SW4 and a capacitor C1 constitute a circuit for actuating only the automatic focusing device 3a.

A switch SW3 is arranged to be operable from the outside of the camera housing, or the automatic winding unit casing, and the switch SW4 is also arranged to hand its movable contact operable for selective engagement with either of fixed contacts a and b from the outside. 8a and 8b are connectors for electrical connection between the camera and the automatic winding device.

The operation of the illustrated embodiment is as follows:

When the camera and the automatic winding unit are coupled with each other, and then when the interchangeable lens 3 is attached, their circuits are connected with each other as illustrated in the block diagram of FIG. 2.

Upon depression of the release button 1 to the first stage of its stroke, the switch SW1 is closed to supply current to the light metering circuit 11 and the automatic focusing device 3a. Also by the closure of the switch SW1, current is allowed to flow through the diode D1 and the resistor R2 to a PNP type transistor Tr1, so the PNP type transistor Tr1 is rendered conductive and supplies current to the automatic focusing device 3a. As a range finding device (not shown) operates, a signal representing the object distance is produced. Responsive to this signal, a motor (not shown) brings the focusing lens to the in-focus position. Upon further depression of the release button 1, the switch SW2 is closed, so that a shutter drive circuit is supplied with current to release a shutter (not shown). Thus, an exposure is made for a predetermined time. When the switch SW3 is closed, an automatic winding circuit and mechanism of known construction operate with the help of the motor M to effect winding or rewinding. When the movable contact of the switch SW4 is moved from its "a" position to its "b" position, the capacitor C1 after having been charged is discharged during a time within which a prescribed potential difference between the connector terminals 3c1 and 3d1 is produced. This makes it possible to supply a sufficient voltage to drive the automatic focusing device 3a. In this case, therefore, the actuation of the release button 1 leads to an autofocus shooting, but automatic film winding does not result. The winding is carried out by turning a winding handle on the camera housing as is known in the art.

As described in greater detail above, the present invention provides an interchangeable lens having a built-in automatic focusing device 3a for controlling focusing movement of the objective lens to an in-focus position with a drive energy source which is served by the battery in the automatic winding unit. This removes the necessity for the automatic focusing device or the interchangeable lens to accommodate a separate electrical power source such as dry batteries. This offers the advantage of preventing an increase in the bulk and size of the interchangeable lens unit casing. Another advantage is it avoids difficulty due to frequent exchanges of batteries which would be otherwise encountered when the batteries are of small capacity, and minimizes failures such as missing picture taking opportunities.

What is claimed is:

1. A photographic system comprising:
a photographic arrangement including:
a camera body, a lens assembly, and automatic focusing means to control a photo-taking lens to an in-focus position, said arrangement further comprising:
(A) first switching means closed by a release operation at the camera body;
(B) first signal terminals to supply power to said automatic focusing means; and
(C) an accessory unit having an electric power source to supply electric power to the automatic focusing means and being attachable to and detachable from the photographic arrangement;
said accessory unit further comprising:
(c1) second signal terminals connected to the first signal terminals;
(c2) charging means to be charged and to generate a prescribed level of potential difference at the second signal terminals by a closing of the first switching means; and
(c3) second switching means connected to said charging means to effect a charging or discharging operation of the charging means.

2. A photographic system according to new claim 1, wherein:
(A) said lens assembly includes a connector, said accessory unit includes a connector and said first signal terminals are retained by the connector on the lens assembly, and said second signal terminals being retained by the connector on the accessory unit;
and wherein the connector on the lens assembly and the connector at the accessory unit sides form a slanted plane therebetween.

3. A photographic system for use with one of plurality interchangeable lenses each having an autofocus arrangement, comprising:
a camera body for receiving the lenses and having a release member,
an accessory unit arranged to receive a source of power and having a pair of power leads, and having means for coupling to said camera body;
a first switch in said camera body and operable by said release member;
a second switch in said accessory unit;
said accessory unit having connector means for electrically connecting the accessory unit to the autofocus arrangement,
a capacitor in said accessory unit;
circuit means in said camera body and said accessoty unit for connecting said power leads across said capacitor through said second switch and to said connector means through said first switch.

4. A system as in claim 3, wherein said system includes said lenses, and wherein:

said interchangeable lenses each form a first plane and have a first signal terminal mounted on the plane, wherein said accessory unit forms a second plane mating with the first plane, and said connector means includes a second signal terminal at the second plane, said planes being slanted relative to the camera body when the accessory unit is mounted on the camera body and causing said first and second signal terminals to engage.

* * * * *